(12) United States Patent
Cline et al.

(10) Patent No.: US 9,154,333 B2
(45) Date of Patent: Oct. 6, 2015

(54) BALANCED MANAGEMENT OF SCALABILITY AND SERVER LOADABILITY FOR INTERNET PROTOCOL (IP) AUDIO CONFERENCING BASED UPON MONITORED RESOURCE CONSUMPTION

(75) Inventors: Brian G. Cline, Hebron, KY (US);
James P. Galvin, Oak Ridge, NC (US);
James W. Lawwill, Jr., Winchester, KY (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 11/964,487

(22) Filed: Dec. 26, 2007

(65) Prior Publication Data

US 2009/0172147 A1   Jul. 2, 2009

(51) Int. Cl.
*G06F 15/16* (2006.01)
*H04L 12/64* (2006.01)
*G06F 15/173* (2006.01)
*H04L 29/06* (2006.01)
*H04L 29/08* (2006.01)

(52) U.S. Cl.
CPC ............ *H04L 12/6418* (2013.01); *H04L 65/80* (2013.01); *H04L 65/403* (2013.01); *H04L 67/1002* (2013.01); *H04L 67/1008* (2013.01); *H04L 67/1025* (2013.01)

(58) Field of Classification Search
USPC .......................................................... 709/224
See application file for complete search history.

(56) References Cited

U.S. PATENT DOCUMENTS

| 6,343,313 | B1 * | 1/2002 | Salesky et al. ................ 709/204 |
| 2003/0041165 | A1 * | 2/2003 | Spencer et al. ................ 709/233 |
| 2005/0152521 | A1 * | 7/2005 | Liljestrand ............... 379/201.03 |
| 2005/0278166 | A1 * | 12/2005 | Tajiri ............................. 704/201 |
| 2012/0221642 | A1 * | 8/2012 | Sekaran et al. ............... 709/204 |

* cited by examiner

*Primary Examiner* — Chris Parry
*Assistant Examiner* — Alan S Chou
(74) *Attorney, Agent, or Firm* — Steven M. Greenberg, Esq.; CRGO Law

(57) ABSTRACT

Embodiments of the present invention address deficiencies of the art in respect to audio stream management in an audio conferencing server and provide a method, system and computer program product for balancing audio server loadability and audio server scalability based upon monitored resource consumption. In an embodiment of the invention, a method for balancing audio server loadability and audio server scalability based upon monitored resource consumption can be provided. The method can include monitoring computing conditions in an audio conferencing server receiving encoded audio packets from coupled Internet Protocol (IP) audio clients and routing the encoded audio packets as audio streams to the IP audio clients, and responsive to detecting deteriorating computing conditions in the audio conferencing server, reducing a number of the audio streams forwarded to the IP audio clients by the audio conferencing server.

15 Claims, 1 Drawing Sheet

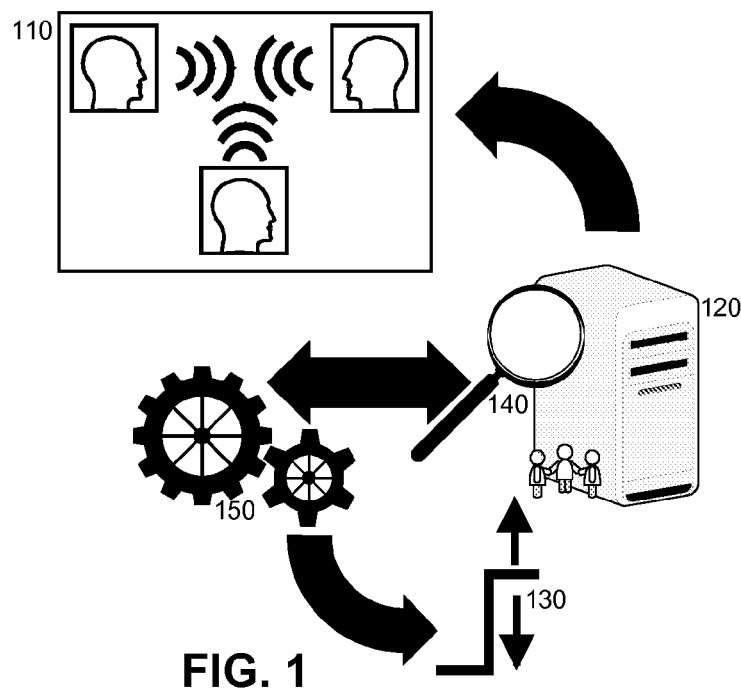
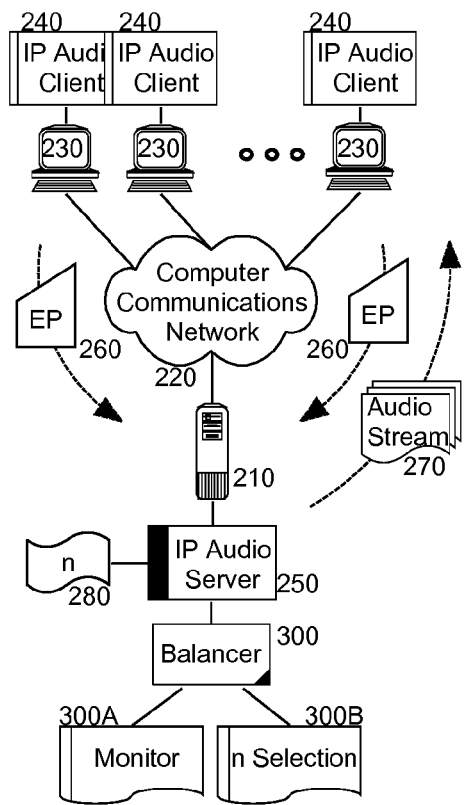
FIG. 2
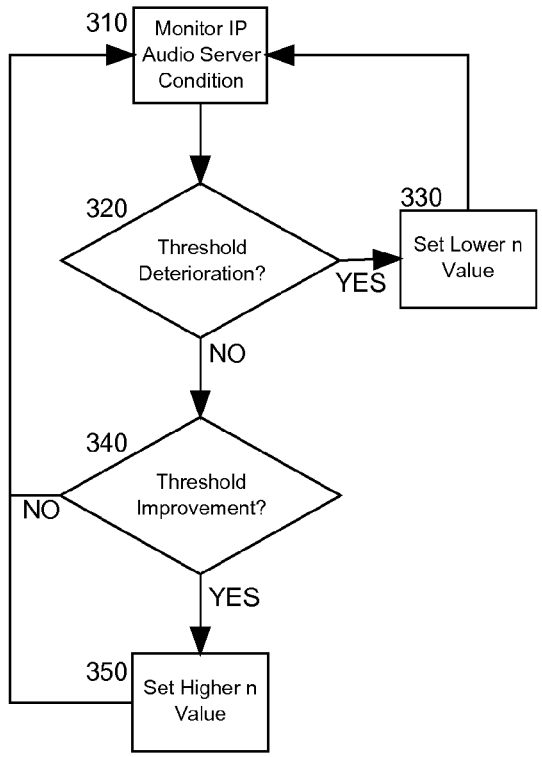
FIG. 3

BALANCED MANAGEMENT OF SCALABILITY AND SERVER LOADABILITY FOR INTERNET PROTOCOL (IP) AUDIO CONFERENCING BASED UPON MONITORED RESOURCE CONSUMPTION

BACKGROUND OF THE INVENTION

1. Field of the Invention

The present invention relates to the field of IP audio conferencing over a computer communications network, and more particularly audio packet throttling based upon server processing capabilities.

2. Description of the Related Art

The advent of the modern computer communications network has revolutionized the manner in which data is exchanged and the speed at which data is exchanged. At the outset of the modern computing era, only the most basic of information could be exchanged between computing devices due to the limitations of network bandwidth and the perceived unreliability of the underlying data exchange media. Today, however, substantial advances in the underlying infrastructure of global computer networks permit the exchange of a wide variety of data ranging from simple text messages to full motion video and audio.

The exchange of real time data such as audio speech involves specific considerations not applicable to the exchange of other types of time insensitive data. In this regard, while the slight delay in the arrival of packets in a text message can be inconsequential in respect to the accurate and efficient delivery of the text message, slight delays in the delivery of real time data such as speech can render the ultimately delivered data unusable for its intended purpose. To account for the time sensitivity of real time data, several real time delivery technologies have been proposed to manage the transport and delivery of real time data. The Real Time Protocol (RTP) represents one example of a real time delivery technology.

RTP is a thin protocol providing support for applications with real-time properties, including timing reconstruction, loss detection, security and content identification. Specifically, RTP provides end-to-end delivery services for data with real-time characteristics, such as interactive audio and video. Those services include payload type identification, sequence numbering, time-stamping and delivery monitoring. Applications typically run RTP on top of the universal datagram protocol (UDP) to make use of its multiplexing and checksum services. In that case, both protocols contribute parts of the transport protocol functionality.

RTP can include a control protocol referred to as the real time control protocol (RTCP). RTCP is based on the periodic transmission of control packets to all participants in the session, using the same distribution mechanism as the data packets. The underlying protocol must provide multiplexing of the data and control packets, for example using separate port numbers with UDP. RTCP several functions, the primary function of which is to provide feedback on the quality of the data distribution. This is an integral part of the RTP's role as a transport protocol and is related to the flow and congestion control functions of other transport protocols.

Notably, RTCP can be used to monitor network conditions so that both sender and receiver can make adjustments to their respective systems to adapt to network conditions. In particular, U.S. Pat. No. 6,643,496 to Shimoyama et al. teaches the adjustment of the packet transmission rate of real time data using RTP over RTCP where a target transmission rate cannot be achieved, or where it is judged that packet loss has occurred. Similarly, U.S. Pat. No. 6,858,613 to Murphy teaches the throttling of audio packets based upon the capabilities of a gateway processing facility encoding the audio packets such that a trade-off is made between packet size and a number of packets transmitted.

Notably, some modern audio conferencing servers employ RTP packet switching to provide multiple streams of audio to participants in a multi-point audio conference. Specifically, the server evaluates the data received from clients and decides which packets should be forwarded to the IP audio clients. The clients are then responsible for mixing the streams received from the server and presenting the resulting audio to the user. This reduces the load on the server, which is acting primarily as a router whereas the clients themselves and not the server encode the audio packets in performing central processing unit (CPU) intensive audio mixing.

Generally, the server can be configured to forward a fixed number of audio streams to the clients. However, forwarding a fixed number of audio streams creates several problems. First, on the server higher values of the fixed number of audio streams will result in a better conferencing experience, but will limit the scalability of the server. Conversely, lower values of the fixed number will improve server scalability, but will adversely impact the quality of the conferencing experience. Accordingly, administrators of a server providing an audio conferencing facility are forced to make this trade-off ahead of time, as part of configuration. Another problem results on the client, where higher values of the fixed number can provide an unacceptable experience for clients on lower speed connections due to packet loss while clients on broadband connections will not be affected. Thus, administrators will tend to choose a lower value to handle the "common denominator" case, so all clients suffer to ensure an acceptable experience for those with lower speed connections.

BRIEF SUMMARY OF THE INVENTION

Embodiments of the present invention address deficiencies of the art in respect to audio stream management in an audio conferencing server and provide a novel and non-obvious method, system and computer program product for balancing audio server loadability and audio server scalability based upon monitored resource consumption. In an embodiment of the invention, a method for balancing audio server loadability and audio server scalability based upon monitored resource consumption can be provided. The method can include monitoring computing conditions in an audio conferencing server receiving encoded audio packets from coupled IP audio clients and routing the encoded audio packets as audio streams to the IP audio clients, and responsive to detecting deteriorating computing conditions in the audio conferencing server, reducing a number of the audio streams forwarded to the IP audio clients by the audio conferencing server.

In one aspect of the embodiment, the method further can include increasing the number of the audio streams forwarded to the IP audio clients by the audio conferencing server responsive to detecting improving computing conditions in the audio conferencing server. In other aspects of the embodiment, monitoring computing conditions in an audio conferencing server can include monitoring CPU load in the audio conferencing server, monitoring memory utilization in the audio conferencing server, monitoring network traffic experienced by the audio conferencing server, monitoring packet loss experienced by the IP audio clients, monitoring reception status reported by the IP audio clients, or any combination thereof. In yet a further aspect of the embodiment, reducing the number of audio streams forwarded to the IP audio clients by the audio conferencing server, can include directing a subset of the IP audio clients to apply a mute in order to reduce a number of encoded audio packets received for routing in the audio conferencing server.

In another embodiment of the invention, an audio conferencing server data processing system can be provided. The system can include an audio conferencing server configured for coupling to different IP audio clients over a computer communications network in order to receive encode packets, such as audio packets, from the IP audio clients and to route resultant audio streams to the IP audio clients. The system further can include a balancer including both a monitor and a selector. The monitor can include program code enabled to monitor computing conditions in the audio conferencing server. The selector, in turn, can include program code enabled to decrease a number of audio streams forwarded to the IP audio clients responsive to the monitor detecting deteriorating computing conditions in the audio conferencing server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for balancing audio server loadability and audio server scalability based upon monitored resource consumption;

FIG. 2 is a schematic illustration of an audio chat server data processing system configured for balancing audio server loadability and audio server scalability based upon monitored resource consumption; and, FIG. 3 is a flow chart illustrating a process for balancing audio server loadability and audio server scalability based upon monitored resource consumption.

DETAILED DESCRIPTION OF THE INVENTION

Embodiments of the present invention provide a method, system and computer program product for balancing audio server loadability and audio server scalability based upon monitored resource consumption. In accordance with an embodiment of the present invention, the computing conditions can be monitored for an audio conferencing server routing encoded audio packets received from coupled IP audio clients. The monitored conditions can include CPU load, memory utilization, network traffic, RTCP client reports of reception status, packet loss, to name a few. As the monitored computing conditions deteriorate, fewer audio streams can be transmitted to the IP audio clients, while as the monitored computing conditions improve, more audio streams can be transmitted to the IP audio clients. In this way, the scalability of the audio conferencing server can be balanced with the load experienced by the audio conferencing server for the benefit of the coupled IP audio clients.

In further illustration, FIG. 1 pictorially depicts a process for balancing audio server loadability and audio server scalability based upon monitored resource consumption. As shown in FIG. 1, an audio conferencing server 120 can manage an audio conference 110 between different chat participants. Each of the chat participants to the audio conference 110 can encode and mix audio packets for respectively provided audio and the packets can be forwarded to the audio conferencing server 120 for routing within a number of audio streams 130 to the other chat participants to the audio conference 110.

Notably, a balancing processor 150 can include a monitor 140 monitoring the computing conditions for the audio conferencing server 120. Those computing conditions can include any one or a combination of CPU load, memory utilization, network traffic, RTCP client reports of reception status, packet loss, and the like. In response to detecting deteriorating computing conditions through the monitor 140, the balancing processor 150 can decrease the number of audio streams 130 to be transmitted to the participants to the audio conference 110. Conversely, in response to detecting improving computing conditions through the monitor 140, the balancing processor 150 can increase the number of audio streams 130 to be transmitted to the participants to the audio conference 110.

The process shown in FIG. 1 can be implemented in an audio chat server data processing system. In illustration, FIG. 2 schematically depicts an audio chat server data processing system configured for balancing audio server loadability and audio server scalability based upon monitored resource consumption. The system can include a host computing platform 210 communicatively coupled to different computing devices 230 over computer communications network 220. The host computing platform 210 can support the operation of an audio conferencing server 250 configured to route a number 280 of audio streams 270 from encoded audio packets 260 received from IP audio clients 240 respectively hosted in different ones of the computing devices 230 from over the computer communications network 220.

Notably, a balancer 300 can be coupled to the audio conferencing server 250. The balancer 300 can include a monitor 300A and a selector 300B. The monitor 300A can include program code enabled to monitor computing conditions in the audio conferencing server 250, such as any one or a combination of CPU load, memory utilization, network traffic, RTCP client reports of reception status, packet loss, and the like. The selector 300B in turn can include program code enabled to select a number of audio streams to be routed to the IP audio clients 240 based upon the computing conditions provided by the monitor 300A.

In this regard, the number of audio packets that the server is transmitting to all IP audio clients 240 can be computed by way of example according to the equation "Packets Transmitted=$((C-n)*R*n)+(n*(n-1)*R)$" where C is the fixed number of IP audio clients 240 to be serviced, n is the value 280 for a number of the audio streams 270 to be forwarded to the IP audio clients 240, and R is the fixed rate of transmission for each of the IP audio clients 240. Accordingly, a higher value for the value 280 results in a higher number of total audio streams 270 transmitted, whereas a lower value for the value 280 results in a lower number of total audio streams 270 transmitted. Optionally, one or more of the IP audio clients 240 can be instructed to apply a mute feature in order to reduce the number of audio streams 270 to be routed by the audio conferencing server 250.

In yet further illustration, FIG. 3 is a flow chart illustrating a process for balancing audio server loadability and audio server scalability based upon monitored resource consumption. The process can begin in block 310 with the monitoring of computing conditions on the audio conferencing server. In decision block 320 if the monitored computing conditions are determined to be deteriorating past a threshold level, in block 330 a lower value for a number of audio streams to be forwarded to IP audio clients can be established. Alternatively, in decision block 340 if the monitored computing conditions are determined to be improving past a threshold level, in block 350 a higher value for a number of audio streams to be forwarded to IP audio clients can be established. Otherwise, no adjustment to the value need be applied.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for balancing audio server loadability and audio server scalability based upon monitored resource consumption, the method comprising:
   monitoring computing conditions in an audio conferencing server receiving encoded audio packets from coupled Internet Protocol (IP) audio clients and routing the encoded audio packets as a number of audio streams to the IP audio clients;
   responsive to detecting deteriorating computing conditions in the audio conferencing server, directing at least one of the IP audio clients to reduce an amount of the encoded audio packets transmitted by the at least one of the IP audio clients to the audio conferencing server;
   reducing the amount of the encoded audio packets transmitted by the at least one of the IP audio clients to the audio conferencing server by directing a subset of the IP audio clients to apply a mute in order to reduce a number of encoded audio packets received for routing in the audio conferencing server and applying the mute; and,
   increasing the amount of the encoded audio packets transmitted by the at least one of the IP audio clients to the audio conferencing server responsive to detecting improving computing conditions in the audio conferencing server.

2. The method of claim 1, wherein monitoring computing conditions in the audio conferencing server comprises monitoring central processing unit (CPU) load in the audio conferencing server.

3. The method of claim 1, wherein monitoring computing conditions in the audio conferencing server comprises monitoring memory utilization in the audio conferencing server.

4. The method of claim 1, wherein monitoring computing conditions in the audio conferencing server comprises monitoring network traffic experienced by the audio conferencing server.

5. The method of claim 1, wherein monitoring computing conditions in the audio conferencing server comprises monitoring packet loss experienced by the IP audio clients.

6. The method of claim 1, wherein monitoring computing conditions in the audio conferencing server comprises monitoring reception status reported by the IP audio clients.

7. An audio conferencing server data processing system comprising:
   an audio conferencing server including a processor and a computer readable storage memory, the audio conferencing server configured for coupling to a plurality of Internet Protocol (IP) audio clients over a computer communications network in order to receive encoded packets from the IP audio clients and to route a resultant number of audio streams to the IP audio clients; and,
   a balancer, executing in the computer readable storage memory by the processor, comprising both a monitor and a selector, the monitor comprising program code enabled to monitor computing conditions in the audio conferencing server, the selector comprising program code enabled to both direct at least one of the IP audio clients to reduce an amount of the encoded audio packets transmitted by the at least one of the IP audio clients to the audio conferencing server by directing a subset of the IP audio clients to apply a mute in order to reduce a number of encoded audio packets received for routing in the audio conferencing server responsive to the monitor detecting deteriorating computing conditions in the audio conferencing server and also to direct at least one of the IP audio clients to increase the amount of the encoded audio packets transmitted by the at least one of the IP audio clients to the audio conferencing server responsive to the monitor detecting improving computing conditions in the audio conferencing server.

8. The system of claim 7, wherein the computing conditions comprise computing conditions selected from the group consisting of central processing unit (CPU) load, memory utilization, network traffic, packet loss and reception status for the IP audio clients.

9. The system of claim 7, wherein the packets are audio packets.

10. A computer program product comprising a non-transitory computer usable storage medium embodying computer usable program code, stored thereon, for balancing audio server loadability and audio server scalability based upon monitored resource consumption, the computer program product comprising:

computer usable program code for monitoring computing conditions in an audio conferencing server receiving encoded audio packets from coupled IP audio clients and routing the encoded audio packets as audio streams to the IP audio clients;

computer usable program code for directing at least one of the IP audio clients to reduce an amount of the encoded audio packets transmitted by the at least one of the IP audio clients to the audio conferencing server in response to detecting deteriorating computing conditions in the audio conferencing server;

computer usable program code for reducing the amount of the encoded audio packets transmitted by the at least one of the IP audio clients to the audio conferencing server by directing a subset of the IP audio clients to apply a mute in order to reduce a number of encoded audio packets received for routing in the audio conferencing server and applying the mute; and, computer usable program code for increasing the amount of the encoded audio packets transmitted by the at least one of the IP audio clients to the audio conferencing server responsive to detecting improving computing conditions in the audio conferencing server.

11. The computer program product of claim 10, wherein the computer usable program code for monitoring computing conditions in the audio conferencing server comprises computer usable program code for monitoring central processing unit (CPU) load in the audio conferencing server.

12. The computer program product of claim 10, wherein the computer usable program code for monitoring computing conditions in the audio conferencing server comprises computer usable program code for monitoring memory utilization in the audio conferencing server.

13. The computer program product of claim 10, wherein the computer usable program code for monitoring computing conditions in the audio conferencing server comprises computer usable program code for monitoring network traffic experienced by the audio conferencing server.

14. The computer program product of claim 10, wherein the computer usable program code for monitoring computing conditions in the audio conferencing server comprises computer usable program code for monitoring packet loss experienced by the IP audio clients.

15. The computer program product of claim 10, wherein the computer usable program code for monitoring computing conditions in the audio conferencing server comprises computer usable program code for monitoring reception status reported by the IP audio clients.

\* \* \* \* \*